July 27, 1926.
J. M. WILLIAMS
LOCK NUT
Filed Nov. 14, 1925
1,594,289
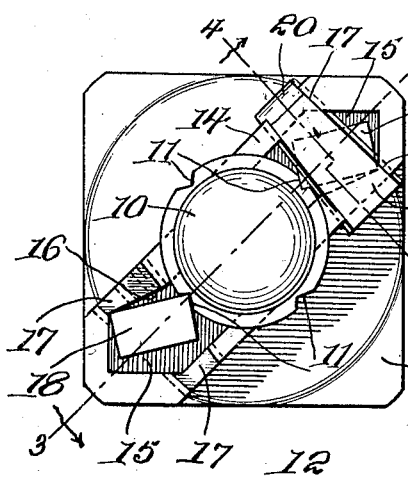
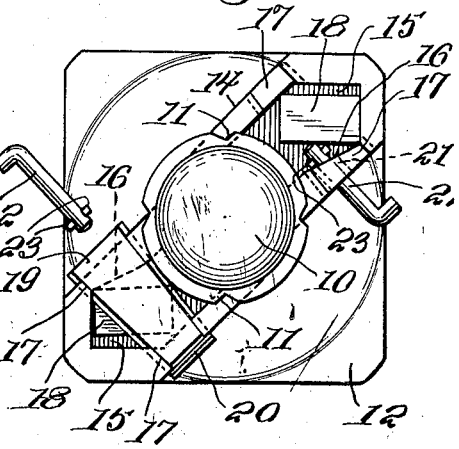
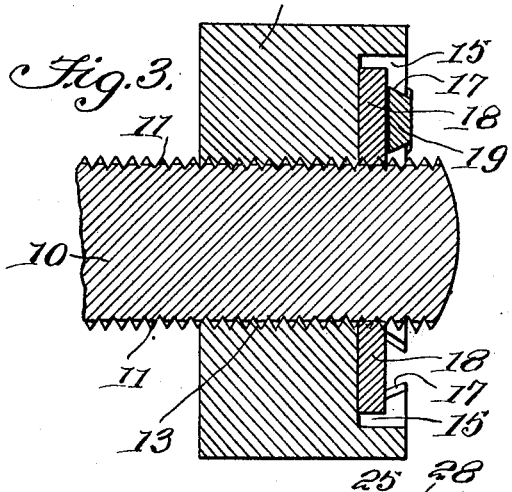
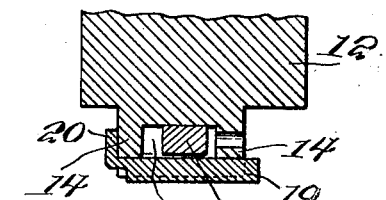
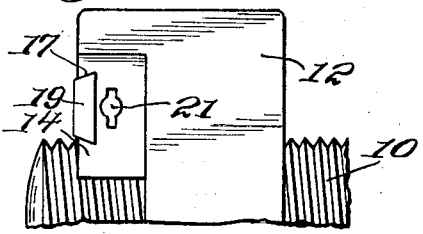
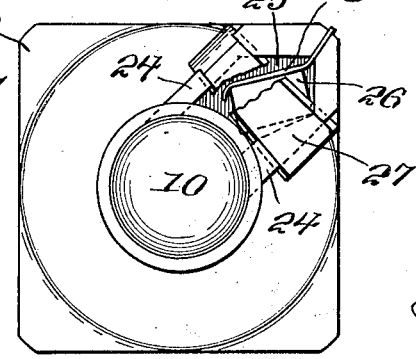
James M. Williams
INVENTOR
BY Victor J. Evans
ATTORNEY
WITNESS:

Patented July 27, 1926.

1,594,289

UNITED STATES PATENT OFFICE.

JAMES MILTON WILLIAMS, OF SANFORD, FLORIDA.

LOCK NUT.

Application filed November 14, 1925. Serial No. 69,102.

This invention relates to lock nuts and has for its object the provision of a novel nut in combination with a bolt, the nut being provided with pawl-like elements coacting with the bolt to permit rotation of the nut in one direction and preventing it in the other direction, means being provided whereby the retaining elements may be released when it is desired to unscrew the nut from the bolt.

An important object of the invention is to provide a nut of this character which is recessed at its outer face for the accommodation of the lock elements so that the outer surface will be substantially flush, thereby preventing likelihood of destruction of the locking parts by contact with any objects which might strike against the nut itself.

An additional object is to provide a device of this character which will be simple and inexpensive in manufacture, easy to use, positive in action, efficient and durable in service, and a general improvement in the art.

With the above and other objects and advantages in view, the invention consists in the details of construction and arrangement of parts to be hereinafter more fully described and claimed, and illustrated in the accompanying drawing in which:

Figure 1 is an elevation of a nut constructed in accordance with the invention, one of the pawl retaining members being removed, Figure 2 is a similar view showing one of the pawl members retracted so that the nut may be turned to effect unscrewing, Figure 3 is a section on the line 3—3 of Figure 1, Figure 4 is a section on the line 4—4 of Figure 1, Figure 5 is a fragmentary side elevation, Figure 6 is a detail perspective view of the pawl releasing member, and Figure 7 is a view similar to Figure 1 showing a modification.

Referring more particularly to the drawings the numeral 10 designates a bolt which, in actual practice, is preferably provided with a plurality of longitudinal extending grooves 11. The numeral 12 designates the nut which is provided with the usual threaded bore 13 and which has its outer face formed with parallel ribs or flanges 14 extending diagonally of the nut and defining a recess 15 having inclined walls or portions 16. The ribs are formed with dovetailed grooves or slots 17 which extend transversely.

Located within the end portions of the recess 15 defined between the ribs are pawl elements 18 which may be simply rectangular blocks of steel and these pawls are adapted to have certain corners thereof engaged within the grooves 11 in the bolt for effecting a locking action, the inclined surfaces 16 referred to constituting abutments with which the pawl elements cooperate for insuring the holding action.

The retaining means for the pawl elements preferably consists of wedges or trapezoidal shaped pieces or strips 19 which are engaged through the dovetailed grooves or slots 17 and which have their smaller ends upset as indicated at 20 in Figure 4 so that when once in place it will be impossible for the wedges or retainers to become displaced. Obviously these members extend over the pawl elements 18 and confine them so that they cannot fall out of or be removed from the ends of the recess 15.

Clearly, the nut may be turned in a clockwise direction, or the bolt may be turned with respect to the nut, without opposition by the pawl members but when an attempt is made to effect rotation in the reverse direction the corners of the pawls will enter the grooves 11 and lock.

Quite naturally it may be desired, at some times to remove the nut and to permit this, I form the ribs 14 with key hole slots 21 leading into the end portions of the recess 15, and provide members 22 having lateral lugs or wings 23 capable of being inserted through the slots 21 to force the pawls away from the bolt as shown in Figure 2. After the pawls are thus released, the members 22 may be turned to bring the wings or lugs 23 thereon out of registration with the corresponding parts of the key hole slots so that the members 22 will remain in their pawl releasing position. The nut may then be freely unscrewed, subsequently to which the members 22 should be removed.

In Figure 7 I have illustrated a slight modification in which the ribs 24 corresponding to the above described ribs 14 are located only at one corner of the nut to define a recess 25 within which is a single pawl member 26 retained as above described by a similarly mounted wedge 27. However, in this form I have illustrated a leaf spring 28 for holding the pawl in engagement with the bolt. Furthermore the bolt is not grooved as the biting action of the corner of the pawl, under the influence of the spring, will suffice to make a positive lock in case an attempt is made to unscrew the nut without the pawl being first released by the employment of the special tool provided for the purpose.

While I have shown and described a preferred embodiment of the invention, it should be understood that I reserve the right to make such changes in the form, construction and arrangement of parts as will not depart from the spirit of the invention or the scope of the subjoined claims.

Having thus described the invention, I claim:

1. In combination with a bolt having longitudinal grooves therein, a lock nut formed with outstanding ribs defining a recess, a gravity actuated pawl member loosely mounted in the recess and adapted to have one corner engage within a groove in the bolt for preventing unscrewing, the ribs being formed with grooves, and a transverse element engaged through said grooves and acting as a retainer for the pawl.

2. In combination with a bolt having longitudinal grooves therein, a lock nut formed with outstanding ribs defining a recess, a gravity actuated pawl member loosely mounted in the recess and adapted to have one corner engage within a groove in the bolt for preventing unscrewing, the ribs being formed with dovetailed grooves, and retaining means for the pawl formed as a wedge member engaged through said grooves with its smaller end upset to prevent retraction, one rib being formed with an opening for the passage of a member by means of which the pawl may be retracted from the bolt.

3. In combination with a bolt having longitudinal grooves therein, a lock nut formed with outstanding ribs defining a recess, a gravity actuated pawl member loosely mounted in the recess and adapted to have one corner engage within a groove in the bolt for preventing unscrewing, the ribs being formed with dovetailed grooves, a wedge member engaged through said grooves with its smaller end upset to prevent retraction, one rib having a key hole slot therein for the reception of means to retract the pawl from the bolt.

In testimony whereof I affix my signature.

JAMES MILTON WILLIAMS.